United States Patent [19]

Schumann

[11] 3,816,815

[45] June 11, 1974

[54] DIGITAL OSCILLOSCOPE AND METHOD OF STORING AND DISPLAYING WAVEFORMS

[75] Inventor: Robert W. Schumann, Madison, Wis.

[73] Assignee: Nicolet Instrument Corporation, Madison, Wis.

[22] Filed: July 6, 1971

[21] Appl. No.: 159,817

[52] U.S. Cl. ............................. 324/112, 324/102
[51] Int. Cl. ............................................. G01r 27/28
[58] Field of Search ........ 324/112, 102; 315/22, 25; 340/15.5

[56] References Cited
UNITED STATES PATENTS

| | | | |
|---|---|---|---|
| 2,521,623 | 9/1950 | Arndt, Jr. et al. ................. | 324/112 |
| 2,858,475 | 10/1958 | Blake ................................ | 340/15.5 |
| 3,134,957 | 5/1964 | Foote et al. ...................... | 340/15.5 |
| 3,158,433 | 11/1964 | Alexander et al. ............... | 340/15.5 |
| 3,323,105 | 5/1967 | Charske ........................... | 315/25 |

Primary Examiner—Alfred E. Smith
Assistant Examiner—Ernest F. Karlsen
Attorney, Agent, or Firm—Lew Schwartz; Wayne A. Siverston

[57] ABSTRACT

An oscilloscope, having a memory, converts incoming electronic impulses or waveforms into binary numbers and displays, measures and stores them. Provision is made for measuring, displaying and storing successive waveforms or for blocking incoming waveforms and observing the last-received, stored waveform repeatedly, at leisure. When observing the stored waveform, provision is also made for admitting a single waveform from an outside source by the activation of a switch on the oscilloscope probe or on its panel or other remote location, or from an external signal. A novel method of storing and displaying waveforms is also disclosed.

15 Claims, 3 Drawing Figures

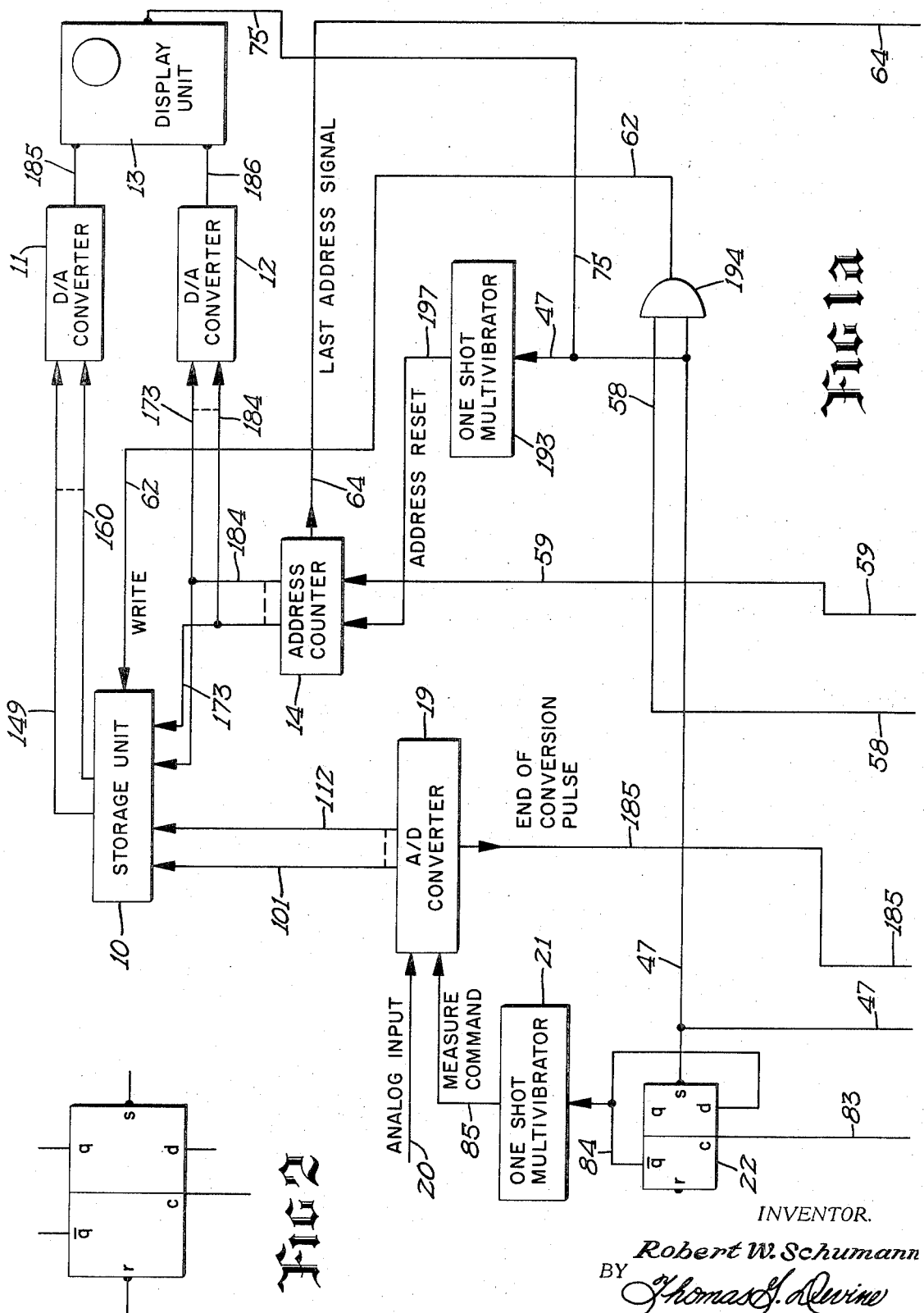

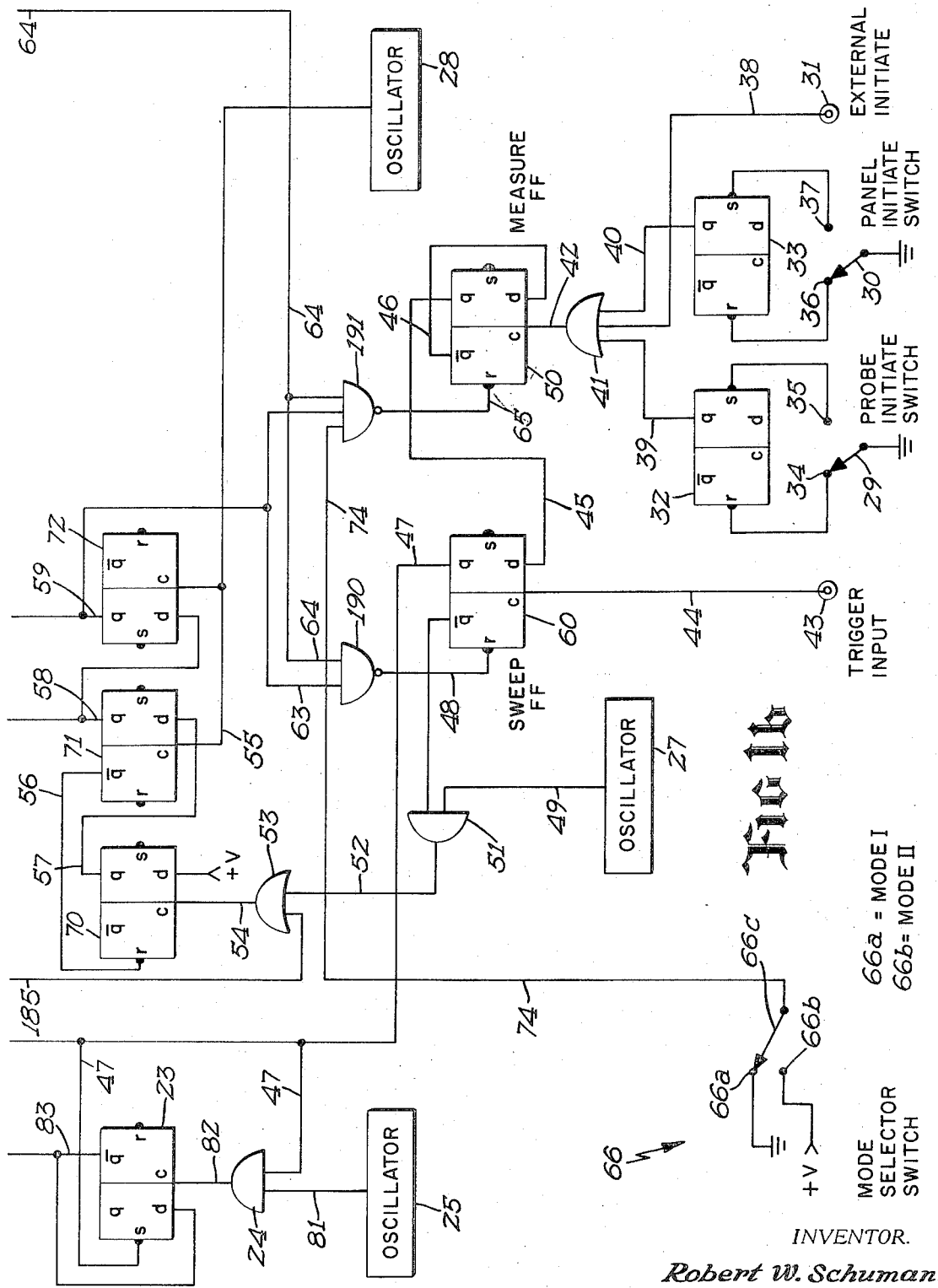

DIGITAL OSCILLOSCOPE AND METHOD OF STORING AND DISPLAYING WAVEFORMS

BACKGROUND OF THE INVENTION

Careful analysis and study of electronic impulses or waveforms is a requirement in many current technologies. The fields of medicine, data reduction, and physics are but a few of those many technologies. Often the analysis and study of the waveforms requires a high degree of accuracy, and also despite the fact that often these impulses or waveforms exist for very short times, it is necessary in some way to observe them for relatively long periods.

The oscilloscope has been an exceedingly useful tool for the study of electronic waveforms and impulses. Storage oscilloscopes have the capability of displaying the waveform on a screen for several minutes after its occurrence, during which time the person operating the storage oscilloscope can examine and interpret the waveform. It is possible with a storage oscilloscope to compare one waveform with another. These instruments are not highly accurate, however, and are not capable of indefinitely long retention and display of the waveform or impulse, They are cumbersome to operate, and in many cases require unusual skill of the person operating the oscilloscope.

Another instrument capable of measurement, retention, and display of signal waveform is the digital signal averager. It has the quality of exceedingly high accuracy, and the capability of retaining and displaying certain waveforms for as long as desired. Other characteristics of importance include the ability to provide waveform information in digital form for hard-copy printing or for transmission of information to a computer for detailed analysis.

Averagers are even more cumbersome to operate than storage oscilloscopes, however. In most waveform measurement situations it is of great importance that operating procedures be simple in order that the human operator not be distracted from his basic objective of observing and understanding the significance of the waveforms then occurring.

Both averagers and storage oscilloscopes have the handicap of requiring that there be an erasure of prior information from their storage media prior to acceptance of new information, except for certain exceptional cases in which the mixture of old and new information is not harmful. The requirement of prior erasure is in itself a disadvantage in that at least one extra operating step is required of the person operating the particular instrument. A major disadvantage arising out of the requirement for prior erasure is that the only waveforms which can be recorded and thereafter displayed are those which follow a decision to record — not the present or last waveform. Quite similar to this problem is that which results from the long duration of an erase operation in averagers and storage oscilloscopes. Even if the waveform to be recorded follows the decision to store, erasure involves so much time that the waveform may have ended before storage can occur.

In the instant invention, there is an automatic erasure or destruction of old information which occurs during each waveform that is to be recorded instead of requiring a tardy, overt act on the part of the operator. Two modes of operation are provided. In MODE I, a simple command in the form of a pulse from external apparatus, or a manually initiated command such as from a pushbutton switch, causes retention and display of the last waveform to have begun prior to the command. A repeat of the same command causes every waveform to be displayed during its occurrence and also to be displayed in the interval, if any, until the next waveform occurs. The display following each command is alternately a "live" display of the waveforms as they occur, and a steady display for as long as desired of the last waveform which occurred. While MODE I is referred to as a single mode, it consists of two sub-modes, one of which may be thought of as the "refresh" sub-mode wherein the last waveform to have occurred is steadily displayed until a new waveform occurs. During the new waveform, the waveform is both displayed and is recorded, after which the representation of its wave shape is steadily displayed. The other sub-mode which may be called the "hold" sub-mode is one in which the new waveforms which may be occurring are rejected, and the display steadily shows the last waveform entered into storage during the preceding "refresh" sub-mode.

In MODE II, the display is normally in the "hold" sub-mode, presenting a steady display of a waveform previously stored. Upon command, as described for MODE I, a new waveform is accepted, stored, and steadily displayed, that waveform being the first to occur following the command from the operator or external apparatus.

BRIEF SUMMARY OF THE INVENTION

This oscilloscope, in a unique way, uses a memory for storing sampled electronic impulses in digital form. The storage unit in the preferred embodiment is of the non-destructive readout type, wherein the process of reading the contents of a particular register within the storage does not result in alteration of those contents. When desired, the contents of any selected register may be altered by a writing process.

The oscilloscope includes an analog-to-digital converter for measuring certain signals and converting the measured values into digital form. The measurements are made at intervals following the occurrence of a trigger signal, if such trigger signal is accepted, and the measured values replace those previously recorded in memory, one memory register being assigned to each measured value.

The acceptance or rejection of trigger signals is dependent upon the sub-mode of operation. In some circumstances all trigger signals are accepted. In another circumstance none are accepted. In still another, only one trigger signal is accepted following a command by the operator.

The preferred embodiment of this invention includes a cathode-ray-tube display operated in such a manner that at essentially all times the beam is positioned vertically according to the present content of the memory register presently being addressed and positioned horizontally according to the present address. In the interval during the measurement of a signal, the beam moves across the screen in a manner substantially the same as for a conventional analog oscilloscope. Following such measurement and recording, the memory is systematically addressed in order to provide a steady display of the waveform previously recorded.

The modes of operation in the preferred embodiment of this invention are selected by use of a two-position switch. Control circuits are provided which respond to the position of this switch in such a way that all, one, or no trigger pulses are accepted following a command signal from another switch or external apparatus, in a manner to be described.

A novel method of storing and displaying waveforms is also an important feature of this invention. Capturing a single waveform occurring after, during or even before the command to capture is given is described later.

BRIEF DESCRIPTION OF THE DRAWINGS

FIGS. 1A and 1B together are a block diagram of the digital oscilloscope system.

FIG. 2 is a logic diagram of the typical flip-flop used in this invention.

DETAILED DESCRIPTION OF THE DRAWINGS

This invention involves the use of known electronic circuits such as analog-to-digital converters, digital-to-analog converters, storage units, oscillators, flip-flops, et cetera. Reference to FIG. 2 which shows a typical flip-flop as used in this invention will be helpful in considering the block diagram of FIG. 1.

This flip-flop is called a "d" type latch. If the d terminal is positive, a positive pulse impressed on the c terminal sets the flip-flop, making the q terminal positive and the $\bar{q}$ terminal ground potential. If terminal d is at ground, a positive pulse on terminal c clears the flip-flop, makes terminal q go to ground and terminal $\bar{q}$ go positive. If a ground potential is applied to terminal r, the flip-flop is cleared, causing terminal q to go to ground and terminal $\bar{q}$ to go positive. If a ground potential is applied to terminal s, the flip-flop is set, making terminal q positive and terminal $\bar{q}$ to go positive. If a ground potential is applied to terminal s, the flip-flop is set, making terminal q positive and terminal $\bar{q}$ ground potential.

FIGS. 1A and 1B placed adjacent each other illustrate in block diagram form the logic connection of this invention. Oscillator 25, oscillator 27 and oscillator 28 are shown. The function of oscillator 25 is to provide timing for sampling incoming waveforms. Oscillator 27 provides impulses to initiate a sequence of events when the incoming waveform information is not being used. Oscillator 28 performs the function of enabling commands when the sequence has been initiated.

Switch 66 enables the operator to select the mode of operation desired. When the contact 66c engages terminal 66a, MODE I has been selected. When terminal 66b is engaged, MODE II has been selected. These modes of operation are fully discussed later.

Switch 29, switch 30 and input 31 enable the operator to selectively alter the mode of operation. Contacts 34 and 35 of switch 29 are connected to terminal r and terminal s, respectively, of flip-flop 32. Since the other side of switch 29 is grounded, engaging terminal 35 places a ground potential on terminal s of flip-flop 32 causing that flip-flop to set. In the preferred embodiment, switch 29 is a pushbutton-type switch which makes contact between terminal 34 and ground when not depressed. Thus, when switch 29 is depressed and released, the voltage at terminal q of flip-flop 32 becomes positive then returns to ground when the switch 29 is released. The purpose of flip-flop 32 is to cause a single positive signal on conductor 39 when switch 29 is depressed, despite possibly intermittent contact against terminal 35, a condition referred to as contact bounce. In the preferred embodiment, switch 29 is located in the probe of the oscilloscope to enable the operator to touch a circuit which is difficult of access, permitting the operator to concentrate on touching the circuit. Once having done that, he can replay the incoming waveform without maintaining contact as will be described later.

Switch 30 is connected to flip-flop 33 through contacts 36 and 37 which are connected, respectively, to the terminal r and terminal s. The other side of switch 30 is grounded permitting flip-flop 33 to be set or cleared depending upon whether terminal 36 or 37 is engaged. In the preferred embodiment, switch 30 is located in the face of the oscilloscope. The function of flip-flop 33 is to eliminate the effects of switch contact bounce.

Still another input is separate terminal 31 to which a positive voltage may be applied which is carried on conductor 38 to OR circuit 41. Flip-flops 32 and 33 are also connected to OR circuit 41 so that any one of these three inputs will pass OR circuit 41 and be impressed on line 42 which is connected to terminal c of measure flip-flop 50. It is understood that other switches and other inputs to OR circuit 41 could be provided.

The $\bar{q}$ terminal is connected to the d terminal of flip-flop 50. The q terminal of flip-flop 50 is connected through conductor 45 to the d terminal of sweep flip-flop 60. Therefore when measure flip-flop 50 is set, it conditions sweep flip-flop 60 to be set by providing a positive voltage on the d terminal of sweep flip-flop 60. A trigger input is provided at terminal 43, such trigger input coming ordinarily from the leading edge of the analog input waveform which then is impressed on terminal c of flip-flop 60 via conductor 44. The trigger input could, of course, come from any desired source.

Sweep flip-flop 60, when set, produces a positive voltage on its q terminal, which positive voltage is impressed on conductor 47 which is connected to AND circuit 24 thus enabling that circuit to pass a positive oscillation from oscillator 25 which is connected to AND circuit 24 via conductor 81. Line 47 is connected to the s terminal of flip-flop 23 and to the s terminal of flip-flop 22, these flip-flops providing a "divide by four" function. The purpose achieved in the divide by four operation is to insure that the time at which the first analog-to-digital conversion takes place following the setting of sweep flip-flop 60 will be soon after that setting. A four times slower frequency for oscillator 25, without use of a divide-by-four circuit would result in the same recurrence rate of analog-to-digital conversions but four times the uncertainty of time of the first conversion with respect to the time of setting of flip-flop 60 since there is no synchronization between oscillator 25 and external events. A detailed description of the divide-by-four operation follows later.

The $\bar{q}$ terminal of flip-flop 22 is connected through conductor 84 to one shot multivibrator 21. A one shot multivibrator circuit is well-known in the art and can be any one of a large selection available. The output of multivibrator 21 is impressed on line 85 as a command input to analog-to-digital converter 19. Another input to analog-to-digital converter 19 is conductor 20 upon which the input waveform is impressed. Analog-to-digital converters are also very well-known in the art and can be chosen from a large selection. Analog-to-digital converter 19 has an output indicating that a conversion has been completed which is conducted on conductor 185 to OR circuit 53.

OR circuit 53 is activated either by the positive voltage on line 185 or by a positive voltage on line 52 which is an output of AND circuit 51 to which is connected the output of oscillator 27 on line 49 together with the $\bar{q}$ terminal output of sweep flip-flop 60 on line 61.

Flip-flop 70 is continually conditioned to be set by impressing a positive voltage on terminal d thereof. The $q$ terminal of flip-flop 70 is connected to the $d$ terminal of flip-flop 71 through conductor 57, conditioning flip-flop 71 to be set after flip-flop 70 has been set. OR circuit 53 is connected through conductor 54 to terminal $c$ of flip-flop 70 to provide a set input.

Oscillator 28 has an output line 55 which is connected to the c terminal of flip-flops 71 and 72 respectively. When line 55 becomes positive, the flip-flops will set if they have been conditioned to be set.

The $\bar{q}$ terminal of flip-flop 71 is connected through conductor 56 to the $r$ terminal of flip-flop 70. The $q$ terminal of flip-flop 71 is connected through conductor 58 to the $d$ terminal of flip-flop 71, conditioning it to be set when the $c$ terminal of flip-flop 72 receives a positive impulse.

The $\bar{q}$ terminal of flip-flop 71 is connected through conductor 58 to AND circuit 194 and then to storage unit 10 on line 62 to initiate a write operation which is described later.

The $q$ terminal of flip-flop 72 is connected through conductor 59 to address counter 14. Line 59 is also connected to NAND circuit 190 and to NAND circuit 191.

Address counter 14 is old in the art and may be chosen from a large available selection. Address counter 14 has output lines 173 through 184 which are connected to storage unit 10 and which define a storage location by a binary number which is 12 bits long. This, of course, is merely a design choice and is not limited to any particular number of bits. An output of address counter 14 occurs when address counter 14 is at its maximum number. This output is transmitted on conductor 64 enabling NAND circuit 190 when line 59 is positive. The output of NAND circuit 190 is connected through conductor 48 to sweep flip-flop 60, causing sweep flip-flop 60 to clear. Line 64 is also connected to NAND circuit 191 along with line 59 and line 74 which comes from switch contact 66c of switch 66 and which is connected to a positive voltage through terminal 66b, enabling NAND circuit 191 in MODE II, thus clearing flip-flop 50 because of a ground potential being impressed on line 65.

Line 47 which is connected to the $q$ terminal of sweep flip-flop 60 is also connected to OR circuit 194 and to one shot multivibrator 193 which in turn is connected to address counter 14 through conductor 197 for resetting address counter 14 to zero whenever sweep flip-flop 60 is set. Output lines 101–102 of analog-to-digital converter 19 carry digital information to the storage unit 10.

The storage unit 10 is also well-known in the art. In the preferred embodiment, storage unit 10 comprises an integrated circuit memory system, containing in this case 4,096 storage registers each of 12 bits capacity. The choice of 12 bits is of course a design choice and not limited to a particular choice of number of bits. In this storage unit, a particular register may be addressed, whereupon output lines 149–160 assume states which are positive or ground according to the state of the addressed register, thereby forming a binary number. When the storage unit 10 receives a write command on conductor 62, the state of the addressed register assumes the state of conductors 101–112 from analog-to-digital converter 19. Analog-to-digital converter 19 maintains, on those 12 wires, the binary representation of the last measured voltage during the interval following the end-of-conversion signal and the start of the next conversion. This is a normal characteristic of many analog-to-digital converters. Thus, upon occurrence of the write command, a binary representation of the last-measured voltage is recorded in the addressed storage unit register.

The output signals from storage unit 10 are essentially static during the time a particular storage location is addressed, in that during such time the output wires continually maintain voltages corresponding to the state of the addressed storage register, excepting of course during negligibly short intervals during which the address is being changed or the state of the storage registers is being changed by a write command.

The contents of the addressed storage register are transmitted over lines 149–160 to digital-to-analog converter 11, a device well-known in the prior art. The output of digital-to-analog converter 11 is connected to display unit 13 through conductor 185. The contents of address counter 14 are presented to digital-to-analog converter 12 over conductors 173–184. Digital-to-analog converter 12 is connected to display unit 13 through conductor 186.

Display unit 13, in the preferred embodiment, employs a cathode ray tube, the beam of which is deflected by horizontal and vertical deflection plates. This type of display device ordinarily has an intensifier circuit, used to brighten the trace when the frequency of repetition is low. In the preferred embodiment, conductor 75 is connected to the intensifier circuit of display unit 13 and to conductor 47 which is connected to the $q$ terminal of sweep flip-flop 60. This invention is not intended to be limited to cathode ray tube displays and, for example, may be applicable to display devices such as gas discharge display devices. Of course, the use of other kinds of display devices may not involve the need for digital-to-analog converters 11 and 12, but may instead be directly controlled by the binary information transmitted by conductors 149–160 and 173–184.

MODE OF OPERATION

This digital oscilloscope is intended to operate in two different modes, each capable of accepting an electronic impulse or waveform, from circuitry outside of the oscilloscope and each capable of displaying the contents of the storage unit 10 of the oscilloscope.

MODE I, Sweep On

Moving switch 29 or switch 30 from left to right causes the output line 39 of flip-flop 32 or output line 40 of flip-flop 33 to become positive in potential. Also, the external initiate input 31 can be made positive by an external command. OR circuit 41 passes the positive voltage to the measure flip-flop 50. A ground potential was originally applied to terminal r of flip-flop 50 from NAND circuit 191 thereby clearing flip-flop 50, making terminal $\bar{q}$ go positive, in turn making terminal d go positive and thus preparing flip-flop 50 to be set by a positive pulse applied at terminal c of flip-flop 50. When flip-flop 50 is set, terminal q becomes positive and by way of line 45 prepares sweep flip-flop 60, previously cleared by the ground potential output of NAND circuit 190 having been applied to terminal r thereof, to be set.

Time 1

A positive trigger input pulse is applied at terminal 43, along line 44 to terminal c of sweep flip-flop 60 causing it to set, making terminal q go positive and thereby causing a positive voltage to be present on line 47. This positive voltage is applied to one shot multivibrator 193 through line 47, causing an output positive pulse to appear on line 197, to address counter 14, thereby clearing its state to zero. One shot multivibrator 193 is responsive only to a positive-going voltage, hence producing an output pulse only at the time flip-flop 60 is first turned on.

Time 2

A positive potential present on line 47 is applied to AND circuit 24 conditioning it to pass an output pulse of oscillator 25 when it occurs.

Time 3

The positive output pulse of AND circuit 24 is applied to terminal c of flip-flop 23 which had been previously set when line 47 was at ground potential and was applied to terminal s. Flip-flop 23 is now cleared.

Time 4

Terminal $\bar{q}$ of flip-flop 23 goes positive and is applied to terminal c of flip-flop 22 which had been set previously as had flip-flop 23. Flip-flop 22 is cleared causing $\bar{q}$ to become positive, initiating a pulse from one shot multivibrator 21. On the fourth successive pulse from oscillator 25, flip-flop 22 is again cleared, causing another output from one shot multivibrator 21.

Time 5

One shot multivibrator 21 therefore produces a positive pulse at one-fourth the frequency rate of the oscillator 25.

Time 6

The analog waveform coming into the oscilloscope at line 20 and into analog-to-digital converter 19 is measured when a positive pulse is received from multivibrator 21.

Time 7

The measurement is converted into a binary number. It is apparent that this preferred embodiment represents only one form of "sampling" — that is, measurement of the waveform at discrete times. Other sampling methods are available and well known. Analog-to-digital conversion is completed and a digital number is sent over lines 101–112 to storage unit 10. At the same time, an "end of conversion pulse," indicating the completion of the conversion is sent on line 185 to OR circuit 53 which passes the positive pulse.

Time 8

Flip-flop 70 is set causing the q terminal thereof to become positive making the d terminal of flip-flop 71 positive, thereby conditioning flip-flop 71 for setting.

Time 9

A pulse from oscillator 28 is transmitted to the c terminal of flip-flop 71 thereby setting it and causing the q terminal thereof to become positive, further causing line 58 to become positive, thereby passing a positive potential through line 58, to be applied to AND circuit 194 which will pass a positive pulse when the sweep flip-flop has been set. This positive output is transmitted on conductor 62 to storage unit 10 enabling a write operation at the address corresponding to the state of address counter 14, the information being written in that address corresponding to the output of analog-to-digital converter 19. At this same time the ground potential at the $\bar{q}$ terminal of flip-flop 71 is transmitted to the r terminal of flip-flop 70 by way of conductor 56 thereby clearing flip-flop 70.

Time 10

Flip-flop 71 is cleared and flip-flop 72 is set by the next pulse from oscillator 28 on conductor 55, thereby causing line 59 to become positive. The positive voltage on line 59 is applied to address counter 14 to initiate an advance in the count. At the same time, if the address counter 14 was filled, line 64 is made positive and satisfies NAND circuit 190, clearing sweep flip-flop 60. When the next trigger input pulse is applied, sweep flip-flop 60 will again be set, and the next waveform sampled, displayed and stored in the same fashion as described.

Time 11

It is usually true that a substantial time might elapse, following Time 10 until the next trigger pulse occurs. If this is not the case, the next trigger pulse will cause flip-flop 60 to again be set and the next waveform will be sampled, stored, and displayed in the same fashion as described. The display was caused during times 1 to 10 by the fact that the display unit beam deflection is always positioned according to the output of storage unit 10 and the output of address counter 14 thereby causing a series of dots to appear on the screen representing the amplitude and time coordinates in a well-known manner.

If, as is usually true, there is a considerable elapsed time between the end of the sweep and the next trigger pulse, then, since terminal $\bar{q}$ of flip-flop 60 is positive, and line 61 is therefore positive, the pulses from oscillator 27 are passed by gate 51 causing the same sequence as previously described to occur, except that:

a. analog-to-digital converter 19 receives no measure commands since line 47 is at ground potential thereby holding flip-flops 22 and 23 set and blocking pulses from oscillator 25;

b. no write commands are transmitted by gate 193 since line 47 is at ground potential.

The sequence therefore merely produces a sequential reading out, non-destructively, to produce a continual display of the information previously recorded into storage unit 10. This is called the Sweep Off display sequence.

Time 12

When a trigger signal is received at terminal 43, the readout sequence is interrupted since flip-flop 60 is turned on by that trigger pulse. As before, address counter 14 is cleared to state zero, and the same sequence as previously described beginning at Time 1 is repeated.

MODE II, Sweep On

This Mode is intended to sweep through the memory just once, measuring, viewing and storing one electronic impulse coming from an outside source. The steps are exactly the same as outlined above for MODE I, Sweep On, except that line 74 is positive because switch 66 has been moved to the terminal 66b. At Time 10, when line 64 is positive because the address counter has counted to the last address, the now three positive inputs to NAND circuit 191, cause the output of that circuit to go to ground thereby grounding the r terminal of flip-flop 50 causing flip-flop 50 to clear. When flip-flop 50 is cleared, it keeps sweep flip-flop 60 from being set, thereby making sweep flip-flop 60 insensitive to the trigger input. A positive action, such as setting flip-flop 50 through switches 29 or 30 or the external initiate 31 is necessary to permit the measurement, display and storage of another waveform from an outside source.

Otherwise, the $\bar{q}$ terminal of flip-flop 60 becomes positive because flip-flop 60 was cleared. A positive voltage is therefore applied via line 61 to AND circuit 51 permitting the positive output pulse from oscillator 27 to pass through AND circuit 51 and through OR circuit 53, setting flip-flop 70. This starts the Sweep Off display of the contents of storage unit 10.

In MODE I, assume that the Sweep On operation is being performed. The person operating the oscilloscope may wish to leisurely view the last input waveform. Unless he takes specific action to permit such leisurely viewing of the display, the next trigger pulse results in a "Sweep On" sequence and consequent loss of information pertaining to the previous waveform, and replacement by new information, whereas his observations of the waveforms being displayed, or some external event, may cause him to wish to retain and study the last one to have occurred. He does this simply by depressing a switch 29 on the oscilloscope probe itself, or a panel mounted switch 30, or by causing a positive pulse to be applied to terminal 31. The $\bar{q}$ terminal of flip-flop 50 being at ground potential before this causes the $d$ input of that flip-flop to receive this ground potential by way of conductor 46, so the positive pulse transmitted by OR gate 41 causes that flip-flop to be reset. The result of this is that conductor 45 transmits the ground potential at the $q$ output terminal of flip-flop 50 to the $d$ input of flip-flop 60, rendering it insensitive to trigger pulses at the $c$ input.

Simply depressing switch 29 or 30 again sets flip-flop 50 and each input waveform can again be measured, stored and viewed.

MODE II is ordinarily used in the Sweep Off operation so that a waveform can be carefully studied. Depressing switch 18 or switch 19 sets flip-flop 50 so that sweep flip-flop 60 is conditioned to be set from incoming trigger input pulse at terminal 43. When sweep flip-flop 60 is set, the input signal to the analog-to-digital converter 19 is measured, stored, and displayed. At the end of the complete cycle which has afforded this operation, flip-flops 50 and 60 are again cleared as described earlier and now the newest waveform admitted can be carefully studied until the operator desires to see still another one.

What is claimed is:

1. A digital oscilloscope having display means and vertical and horizontal positioning means operatively connected to the display means comprising:
    a. means for converting an analog electronic waveform into a digital representation, said converting means including input and output means and further comprising:
        i. an analog-to-digital converter having input means for receiving an analog electronic waveform and for receiving a sample pulse, and being adapted to change the waveform into a digital representation when a sample pulse is present;
        ii. oscillator means for producing electronic impulses:
        iii. sample means, having input means connected to the oscillator means for receiving the electronic impulses and output means electrically connected to the analog-to-digital converter, and adapted to be triggered by the leading edge of the impulse, for producing sample pulses at regular timed intervals for transmission to the analog-to-digital converter; and
        iv. conversion signal means, electrically connected to the analog-to-digital converted and to the control means, for signaling the completion of a conversion of an analog waveform into a digital representation:
    b. storage means having input means connected to the output means of the means for converting an analog electronic waveform into a digital representation and output means, said storage means for this comprising:
        i. a storage unit, having a plurality of contents-alterable, addressable storage locations;
        ii. address counting means operatively connected to the storage unit for sequentially addressing each addressable storage location, electrically connected to the horizontal position enabling means; and
        iii. count signal means, connected to the counting means and to the control means for signaling when the counting means has counted to a prescribed number;
    c. vertical position enabling means, connected to the output means of the storage means and electrically connected to the vertical positioning means;
    d. horizontal position enabling means, connected to the output means of the storage means and electrically connected to the horizontal positioning means;
    e. inhibit means, operably connected for selectively inhibiting the alteration of the contents of the addressable storage locations; and
    f. control means operably connected to all of the above-named means and including; means for causing a cyclical non-destructive reading of the contents of the addressable storage locations; means for controlling the storing of digital representations in the addressable storage locations in sequence and means for selectively causing the inhibit means to become operative, independently of the contents of the addressable storage locations, upon completion of the cycle of storing during which the inhibit was selected to become operative.

2. The digital oscilloscope of claim 1 wherein the vertical position enabling means further comprise:
    i. a digital-to-analog converter.

3. The digital oscilloscope of claim 1 wherein the horizontal position enabling means further comprise:
    i. a digital-to-analog converter.

4. A digital oscilloscope having display means and vertical and horizontal positioning means operatively connected to the display means comprising:

a. analog-to-digital conversion means having input and output means, said conversion means comprising:
   i. an analog-to-digital converter having input means for receiving an analog electronic waveform and for receiving a sample pulse, and being adapted to change the waveform into a digital representation when a sample pulse is present;
   ii. oscillator means for producing electronic impulses;
   iii. sample means, having input means connected to the oscillator means for receiving the electronic impulses and output means electrically connected to the analog-to-digital converter, and adapted to be triggered by the leading edge of the impulse, for producing sample pulses at regular timed intervals for transmission to the analog-to-digital converter; and
   iv. conversion signal means, electrically connected to the analog-to-digital converter and to the control means, for signaling the completion of a conversion of an analog waveform into a digital representation;
b. storage means having input means connected to the output means of the analog-to-digital conversion means and output means, said storage means further comprising:
   i. a storage unit, having a plurality of contents-alterable, addressable storage locations;
   ii. address counting means operatively connected to the storage unit for sequentially addressing each addressable storage location, electrically connected to the horizontal position enabling means; and
   iii. count signal means, connected to the counting means and to the control means for signaling when the counting means has counted to a prescribed number;
c. vertical position enabling means, connected to the output means of the storage means and electrically connected to the vertical positioning means;
d. horizontal position enabling means, connected to the output means of the storage means and electrically connected to the horizontal positioning means;
e. inhibit means, operably connected to the analog-to-digital conversion means for selectively inhibiting the operation of the analog-to-digital conversion means; and
f. control means, operably connected to all of the above-named means for sequential reading of the contents of the addressable storage locations when the inhibit means are operating, and for sequential reading and storing in the addressable storage locations when the inhibit means are not operating.

5. The digital oscilloscope of claim 4 wherein the vertical position enabling means further comprise:
   i. a digital-to-analog converter.

6. The digital oscilloscope of claim 4 wherein the horizontal position enabling means further comprise:
   i. a digital-to-analog converter.

7. The digital oscilloscope of claim 4 wherein the inhibit means further comprise:
   i. bi-stable means, having output means, electrically connected to the count signal means for selectively clearing the bi-stable means, and electrically connected to the sample means, and having input means and output means;
   ii. trigger input means, connected to the input means of the bi-stable means for transmitting a trigger input electronic impulse to the bi-stable means;
   iii. remote switch means, electrically connected to the input means of the bi-stable means for conditioning the bi-stable means to react to the trigger impulse; and
   iv. clear control means, electrically connected to the output means of the bi-stable means and electrically connected to the address counting means for clearing the address counting means when the bi-stable means are set by a trigger input electronic impulse.

8. The digital oscilloscope of claim 7, further having at least one probe means wherein the remote switch means further comprises at least one switch means located on the probe means.

9. The digital oscilloscope of claim 4 wherein the control means further comprise:
   i. sequencing means, having input means electrically connected to the conversion signal means, the sequencing means being responsive to the conversion signal means; and having output means;
   ii. increment control means, connected to the output means of the sequence means and electrically connected to the address counting means for causing the counting means to incrementally increase the count;
   iii. write control means, connected to the output means of the sequence means and electrically connected to the storage means for selectively causing writing into the addressable storage locations;
   iv. first oscillator means electrically connected to the sequencing means for starting the sequencing means when the inhibiting means are operating; and
   v. second oscillator means electrically connected to the sequencing means for enabling the sequence means when started by conversion signal means or by the first oscillator means.

10. The digital oscilloscope of claim 7 wherein the control means further comprise:
   i. sequencing means, having input means electrically connected to the conversion signal means, the sequencing means being responsive to the conversion signal means; and having output means;
   ii. increment control means, connected to the output means of the sequence means and electrically connected to the address counting means for causing the counting means to incrementally increase the count;
   iii. write control means, connected to the output means of the sequence means and electrically connected to the storage means for selectively causing writing into the addressable storage locations;
   iv. first oscillator means electrically connected to the sequencing means for starting the sequencing means when the inhibiting means are operating; and v. second oscillator means electrically connected to the sequencing means for enabling the sequence means when started by the conversion signal means or by the first oscillator means.

11. The digital oscilloscope of claim 4 wherein the vertical position enabling means further comprise:
   i. a digital-to-analog converter.

12. The digital oscilloscope of claim 11 wherein the horizontal position enabling means further comprise:
   i. a digital-to-analog converter.

13. The digital oscilloscope of claim 12, further having at least one probe means wherein the remote switch means further comprises at least one switch means located on the probe means.

14. The digital oscilloscope of claim 13 wherein the control means further comprise:
   i. sequencing means, having input means electrically connected to the conversion signal means, the sequencing means being responsive to the conversion signal means; and having output means;
   ii. increment control means, connected to the output means of the sequence means and electrically connected to the address counting means for causing the counting means to incrementally increase the count;
   iii. write control means, connected to the output means of the sequence means and electrically connected to the storage means for selectively causing writing into the addressable storage locations;
   iv. first oscillator means electrically connected to the sequencing means for starting the sequencing means when the inhibiting means are operating; and
   v. second oscillator means electrically connected to the sequencing means for enabling the sequence means when started by the conversion signal means or by the first oscillator means.

15. The digital oscilloscope of claim 14, further having intensifier means, wherein the inhibit means further comprise:
   v. intensifier control means, connected to the output means of the bi-stable means and electrically connected to the intensifier means for selectively actuating the intensifier means.

* * * * *